(12) United States Patent
Welter et al.

(10) Patent No.: US 11,014,071 B1
(45) Date of Patent: May 25, 2021

(54) POROUS POLYMER MATERIAL FOR BONDING METAL-CONTAINING IONS OR FOR PURIFYING ORGANIC MOLECULES

(71) Applicant: instrAction GmbH, Mannheim (DE)

(72) Inventors: Martin Welter, Neckargemünd (DE); Christian Meyer, Schwetzingen (DE); Kristian Lungfiel, Bickenbach (DE); Thomas Schwarz, Cologne (DE)

(73) Assignee: instrAction GmbH, Mannheim (DE)

( * ) Notice: Subject to any disclaimer, the term of this patent is extended or adjusted under 35 U.S.C. 154(b) by 0 days.

(21) Appl. No.: 15/777,967

(22) PCT Filed: Nov. 25, 2016

(86) PCT No.: PCT/EP2016/078787
§ 371 (c)(1),
(2) Date: May 22, 2018

(87) PCT Pub. No.: WO2017/089523
PCT Pub. Date: Jun. 1, 2017

(30) Foreign Application Priority Data

Nov. 27, 2015 (DE) ............... 10 2015 015 220.3
Jun. 24, 2016 (EP) ................................ 16176161

(51) Int. Cl.
*B01D 15/08* (2006.01)
*B01D 15/38* (2006.01)
(Continued)

(52) U.S. Cl.
CPC .......... *B01J 20/267* (2013.01); *B01D 15/08* (2013.01); *B01D 15/3828* (2013.01);
(Continued)

(58) Field of Classification Search
CPC ............... B01J 20/267; B01J 20/28021; B01J 20/28051; B01J 20/285; B01J 20/305;
(Continued)

(56) References Cited

U.S. PATENT DOCUMENTS 4,933,372 A * 6/1990 Feibush ............... B01J 20/26
521/122
8,703,157 B2 * 4/2014 Kita ................... A61L 27/26
424/400

FOREIGN PATENT DOCUMENTS

EP 2570185 A1 3/2013
WO 0132760 A1 5/2001
(Continued)

OTHER PUBLICATIONS

Hou, X., et al., "Synthesis and properties of porous polyvinylamine microspheres from acrylonitrile", Journal of Polymer Science: Part A: Polymer Chemistry, vol. 46, 1674-1682. (Year: 2008).*
(Continued)

*Primary Examiner* — Benjamin L Lebron
(74) *Attorney, Agent, or Firm* — RatnerPrestia

(57) ABSTRACT

A method for producing porous particles of a cross-linked polymer, and porous particles that can be produced according to the method are disclosed. The porous particles of a crosslinked hydroxy- or amino-group-containing polymer have a relatively low swelling factor. A composite material contains the porous particles dispersed in a continuous aqueous phase. The porous particles, or the composite material, are used for purifying organic molecules and for bonding metals from solutions. A filter cartridge contains the porous particles of a cross-linked polymer or the composite material.

13 Claims, 6 Drawing Sheets

(51) Int. Cl.
*B01J 20/26* (2006.01)
*B01J 20/28* (2006.01)
*B01J 20/285* (2006.01)
*B01J 20/30* (2006.01)
*B01J 20/32* (2006.01)
*C02F 1/28* (2006.01)
*C08J 3/075* (2006.01)
*B01D 15/36* (2006.01)
*C02F 101/30* (2006.01)
*C02F 101/20* (2006.01)

(52) U.S. Cl.
CPC ....... *B01J 20/285* (2013.01); *B01J 20/28021* (2013.01); *B01J 20/28054* (2013.01); *B01J 20/305* (2013.01); *B01J 20/3282* (2013.01); *C08J 3/075* (2013.01); *B01D 15/362* (2013.01); *B01D 15/363* (2013.01); *B01J 20/28078* (2013.01); *B01J 2220/62* (2013.01); *C02F 1/285* (2013.01); *C02F 2101/20* (2013.01); *C02F 2101/30* (2013.01); *C02F 2201/006* (2013.01); *C08J 2300/104* (2013.01); *C08J 2300/106* (2013.01)

(58) Field of Classification Search
CPC ............................. B01J 20/3282; B01J 20/268; B01J 20/28019; B01J 20/3057; B01J 2220/062; B01J 2220/52; B01J 20/28054; B01J 20/28078; C08J 3/075; C08J 2300/104; C08J 2300/106; C08J 9/26; C08J 9/0061; C08J 9/36; C08J 2201/0442; C08J 2201/0462; C02F 1/285; C02F 2101/20; C02F 2101/30; C02F 2201/006; C02F 3/342; C12N 9/96; C12Y 304/21004; B01D 15/08; B01D 15/362; B01D 15/363; B01D 15/3828
See application file for complete search history.

(56) References Cited

FOREIGN PATENT DOCUMENTS

WO 2013063772 A1 5/2013
WO 2015077771 A1 5/2015

OTHER PUBLICATIONS

Thoniyot, P., et al., "Nanoparticle-hydrogel composites: concept, design, and application of tehse promising, multi-functional materials", Advanced Science, 2. February. (Year: 2015).*

Kabiri, K., et al., "Superabsorbent hydrogel composites and nanocomposites: a review", Polymer Composites, 32: 277-289. (Year: 2011).*

Hassan, C., et al., "Structure and applications of poly(vinyl alcohol) hydrogels produced by conventional crosslinking or by freezing/thawing methods", Advances in Polymer Science, vol. 153, 37-65. (Year: 2000).*

Choi, D., and Ryoo, R., "Template synthesis of ordered mesoporous organic polymeric materials using hydrophobic silylated KIT-6 mesoporous silica", Journal of Materials Chemistry, vol. 20, 5544-5550. (Year: 2010).*

Fuertes, A., et al., "Control of the structural properties of mesoporous polymers synthesized using porous silica materials and templates", Microporous and Mesoporous Materials, vol. 112, 319-326. (Year: 2008).*

International Search Report and Written Opinion for International Application No. PCT/EP2016/078787, dated Feb. 3, 2017—10 pages.

Fujii et al., "Cross-Linked DNA Capsules Templated on Porous Calcium Carbonate Microparticles," Colloids and Surfaces A: Physicochemical and Engineering Aspects, 2010, vol. 356, pp. 126-133.

* cited by examiner

US 11,014,071 B1

POROUS POLYMER MATERIAL FOR BONDING METAL-CONTAINING IONS OR FOR PURIFYING ORGANIC MOLECULES

CROSS REFERENCE TO RELATED APPLICATIONS

This patent application is the U.S. National Phase Patent Application of PCT Application No.: PCT/EP2016/078787, filed Nov. 25, 2016, which claims priority to German Patent Application No. 10 2015 015 220.3, filed Nov. 27, 2015 and European Patent Application No. 16176161.4, filed Jun. 24, 2016, each of which is incorporated by reference herein in its entirety.

FIELD OF THE INVENTION

The invention in hand concerns a method for producing porous particles from a cross-linked polymer, and the porous particles themselves which can be produced according to the invention. Furthermore, the invention in hand also concerns porous particles from a cross-linked polymer containing hydroxyl or amino groups and with a relatively small swelling factor. The invention in hand also concerns a composite material in which the porous particles according to the invention are dispersed in a continuously aqueous phase. Another object of the invention also concerns a method for producing the composite material according to the invention. The porous particles according to the invention and the composite material according to the invention, respectively, are/is used for the purifying of organic molecules as well as the binding of metal-containing ions from solutions. The invention in hand also concerns a filter cartridge which contains porous particles according to the invention from a cross-linked polymer or the composite material according to the invention.

BACKGROUND OF THE INVENTION

The removal and extraction, respectively, or recovery of metal-containing ions, in particular heavy metal-containing ions, from industrial waste water, for example in electroplating plants, from catalyst residues from the petrochemical or pharmaceutical industry, from mine drainage water and seepage water, for example from wines, the renaturation of soil contaminated with heavy metals etc. is a task of increasing importance because heavy metal-containing ions in particular either have an environmentally damaging effect and their recovery is of financial interest as well with a view to rare or economically strategic metals. This means that environmental aspects have priority for the one part, but for the other part, the provision of precious metals whose availability becomes more and more doubtful and whose price goes up, respectively, is also of great interest. Another important field of application of sorbents for the removal and extraction, respectively, or recovery of metal-containing ions and heavy metal-containing ions, respectively, is the separation of these in the scope of drinking water purification and desalination of sea water. The separation of heavy metal-containing ions from concentrated saline solutions such as they are used for chlorine-alkali electrolysis or similar methods is also of great interest.

Phases/sorbents known at present often have no sufficient binding capacity for the binding of the metal-containing ions to be bound to a sufficient extent for the areas of application mentioned, for example from highly concentrated and low-concentrated solutions, respectively, or strongly acidic solutions, in particular also in the presence of alkaline or alkaline earth metal ions. The reason for this is often that there is no sufficient number of binding sites for the metal-containing ions and that the sorbents are only accessible for the metals from one side, respectively. Furthermore, phases known at present often show no stability across the whole range from pH 0 to pH 14. That applies in particular to sorbents based on silica gel. Another disadvantage of many phases known at present is that the respective metal-containing ion can be bound but cannot be recovered easily or at all from the sorbent used. The binding capacity of known sorbents/phases which is not satisfactory in most cases often necessitates a great sorbent/phase volume, as a result of which the binding methods for metal-containing ions are very time-consuming and not cost-efficient. In addition, the mostly small binding capacity of known binding sorbents for metal-containing ions often necessitates a more frequent regeneration of the sorbents.

Something similar also applies to sorbents which are used as chromatographic material for separations. Here, sorbents which are comprised of a porous carrier material and a coating co-deposited on it of a selective binding polymer are often used. The binding capacity of such sorbents is mostly limited because only a certain percentage of the pore volume of the carrier material can be coated with the selective binding polymer in order to maintain the accessibility of the stationary phase. In addition, there are interactions between the carrier material and the coating and the target molecule. These interactions result in a reduced binding capacity and can be very disruptive for certain chromatographic (filter) applications. For that reason, it would be preferable to provide a chromatographic sorbent which does not have the above-mentioned disadvantages, and which has an improved binding capacity. respectively.

SUMMARY OF THE INVENTION

For that reason, the purpose of the invention in hand was the providing of a new sorbent which does not have part or all of the above-mentioned disadvantages. In particular, one purpose of the invention in hand is the providing of a sorbent with a high binding capacity for metal-containing ions and organic molecules, respectively. Preferably, it should be possible to sanitize the sorbent with sodium hydroxide and to recover the metal-containing ions and organic molecules in an easy manner, respectively. Another purpose of the invention in hand is the providing of a sorbent which still has a relatively high binding capacity for metals even under acidic conditions.

Furthermore, the volume of the sorbent used for binding the target molecules is to be reduced as compared with metal binding sorbents and chromatographic sorbents, respectively, known from the state of the art.

The purpose of the invention in hand is accomplished by means of a method for producing porous particles from a cross-linked polymer, whereby the method comprises the following steps:

(a) Application of an organic polymer onto a porous inorganic carrier material in particulate form;
(b) Cross-linking of the organic polymer in the pores of the inorganic carrier material; and
(c) Dissolving out of the inorganic carrier material to obtain the porous particles from a cross-linked organic polymer.

The organic polymer used in step (a) will simply be referred to as "polymer" below.

DETAILED DESCRIPTION OF EMBODIMENT OF THE INVENTION

Figure 1:
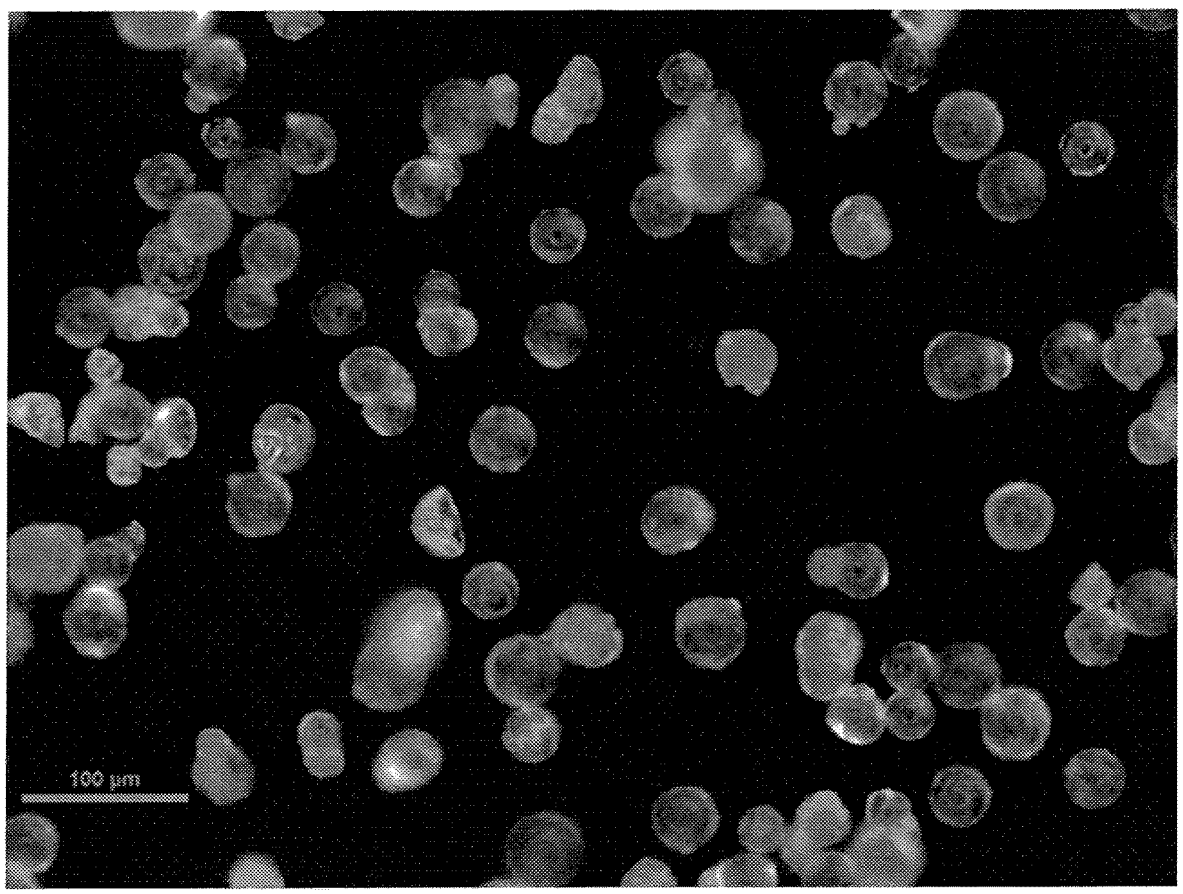
FIG. 1 shows a photographic image of porous particles of a cross-linked polymer according to the invention.

According to the invention, the porous particles from a cross-linked polymer can also be referred to as sorbent in the above-described sense.

The porous inorganic carrier material in particulate form is preferably a mesoporous or microporous carrier material. The mean pore size of the porous carrier material is preferably in the range from 6 nm to 400 nm, more preferably in the range from 8 to 300 nm and most preferably in the range from 10 to 150 nm. Furthermore, the porous carrier material preferably has a pore volume in the range from 30 percent by volume to 90 percent by volume, more preferably from 40 to 80 percent by volume and most preferably from 60 to 70 percent by volume, with reference to the total volume of the porous carrier material in each case. The mean pore size and the pore volume of the porous carrier material can be determined by means of the pore filling method with mercury according to DIN 66133.

The porous inorganic material is one which can preferably be dissolved under aqueous-alkaline conditions at a p greater than 10, more preferably a pH greater than 11, and most preferably a pH greater than 12. In other words, step (c) of the dissolving out of the inorganic carrier material is carried out to obtain the porous particles from a cross-linked polymer under the above-mentioned aqueous-alkaline conditions. The porous inorganic material is preferably one on the basis of silicon dioxide and silica gel, respectively, and is comprised of these, respectively.

The porous inorganic carrier material is preferably a particulate material with an average particle size in the range from 5 μm to 2000 μm, more preferably in the range from 10 am to 1000 μm. The shape of the particles may be ball-shaped (spherical), bacillar, lenticular, donut-shaped, elliptical or also irregular here, whereby ball-shaped particles are preferred.

The portion of polymer used in step (a) is in the range from 5 percent by weight to 50 percent by weight, more preferably 10 to 45 percent by weight and even more preferably 20 to 40 percent by weight, with reference to the weight of the porous inorganic carrier material without polymer in each case.

The application of the polymer onto the porous inorganic carrier material in particulate form in step (a) of the method according to the invention can be carried out with several methods, such as impregnation methods, or the pore filling method, whereby the pore filling method is preferred. In comparison with conventional impregnation methods, the pore filling method has the advantage that a larger quantity of dissolved polymer can be applied onto the porous inorganic carrier material on the whole in one step, which increases the binding capacity.

For all conceivable methods in step (a), the polymer has to be dissolved in a solvent. As solvent for the polymer applied in step (a), one in which the polymer can be dissolved is preferably used. The concentration of the polymer for the application onto the porous inorganic carrier material is preferably in the range from 5 g/l to 200 g/l, more preferably in the range from 10 g/l to 180 g/l, most preferably in the range from 30 to 160 g/l.

In general, we understand a special coating method during which a solution which contains the polymer to be applied is applied to the porous inorganic carrier material in the quantity which equals the total volume of the pores of the porous carrier material by the pore filling method. The total volume of the pores [V] of the porous inorganic carrier material can be determined based on the solvent absorption capacity (WAC) of the porous inorganic carrier material. The relative pore volume [percent by volume] can also be determined. That is the volume of the freely accessible pores of the carrier material in each case because this is the only one which can be determined based on the solvent absorption capacity. The solvent absorption capacity indicates the volume of a solvent which is required to fill the pore space of one gram of dry sorbent (preferably stationary phase) completely. Pure water or aqueous media as well as organic solvents such as dimethyl formamide can be used as solvents here. If the volume of the sorbent increases when moistened (swelling), the solvent volume used for that is recorded automatically. In order to measure the WAC, a precisely weighed quantity of the porous inorganic carrier material is soaked with an excess of well-wetting solvent, and excessive solvent is removed from the interparticle volume in a centrifuge by means of rotation. The solvent within the pores of the sorbent remains in the pores due to the capillary forces. The weight of the solvent retained is determined by weighing and converted in a volume based on the density of the solvent. The WAC of a sorbent is specified as volume per gram of dry sorbent (ml/g).

After step (a), but preferably before step (b), the solvent in which the polymer is applied onto the porous inorganic carrier material is preferably removed by drying of the material at temperatures in the range from 40° C. to 100° C., more preferably in the range from 50° C. to 90° C., and most preferably in the range from 50° C. to 75° C. In particular, drying is carried out with a pressure in the range from 0.01 to 1 bar here, more preferably with a pressure in the range from 0.01 to 0.5 bar.

The step (a) mentioned of the application of a polymer onto a porous inorganic carrier material in particulate form according to the pore filling method and the subsequent drying step can be repeated once or several times before step (b) of the cross-linking of the polymer. If the pore filling method is again used for the repeat steps, the total volume of the pores is determined by means of a differential weighing of the moist material and the dry material after step (a) which is available for the repeated application of the polymer onto the porous inorganic carrier material.

The respective removal of the solvent used with the pore filling method is preferably realized by means of drying in a ploughshare dryer because this step can be considerably accelerated in that way.

As an alternative to the repeated application of a polymer, after step (a) or after step (b), a step can also be carried out during which another layer of a polymer is applied through a condensation reaction of an organic compound with at least 2 amino groups and an organic compound able to form a covalent bond with at least 2 nitrogen atoms of the amino groups. The organic compound with at least 2 amino groups is preferably one which contains amino groups to such an extent that the ratio of nitrogen and carbon (N/C) is in the range from 0.1 to 1.1, more preferably in the range from 0.4 to 1. The organic compound with at least 2 amino groups can be a diamine, triamine, tetraamine or any polyamine. An example of that is ethylene diamine. The organic compound which can form a covalent bond with at least 2 nitrogen atoms of amino groups can be a cross-linking agent, like they are mentioned down below in connection with the cross-linking of the organic polymer. The use of epichlorohydrin is particularly preferred here.

After the step of the application of the polymer and after the drying of the polymer applied onto the porous inorganic carrier material, respectively, the cross-linking of the polymer in the pores of the inorganic carrier material is carried out in a step (b).

The cross-linking of the polymer in the pores of the inorganic carrier material in step (b) of the method according to the invention is preferably carried out in such a way that the degree of cross-linking of the polymer is at least 10%, with reference to the total number of the groups of the polymer which can be cross-linked. The degree of cross-linking can be adjusted by using the respective wanted quantity of cross-linking agent. Here, it is assumed that 100 mole percent of the cross-linking agent react and form cross-links. That can be verified by means of analytical methods such as MAS-NMR spectroscopy and quantitative determination of the quantity of cross-linking agent with reference to the quantity of the polymer used. According to the invention, this method is to be preferred. However, the degree of cross-linking can also be determined by means of IR spectroscopy, for example with reference to C—O—C or O vibrations using a calibration curve. Both methods are analytical standard methods for an expert in that domain. The maximum degree of cross-linking is preferably 60%, more preferably 50%, and most preferably 40%. If the degree of cross-linking is above the upper limit indicated above, the polymer coating of the polymer containing amino groups is not flexible enough and results in a reduced binding capacity for metal-containing ions. If the degree of cross-linking is below the lower limit indicated above, the resulting porous particles from the cross-linked polymer are not rigid enough in order to be used, for example, as particles of a chromatographic phase in which higher pressures will partly also be applied. If the resulting porous particles from the cross-linked polymer are directly used as material for a chromatographic phase, the degree of cross-linking of the polymer is preferably at least 20%.

The cross-linking agent used for cross-linking has preferably two, three or more functional groups through the binding of which to the polymer the cross-linkage is brought about. The cross-linking agent which is used to cross-link the polymer applied in step (a) is preferably selected from the group comprising dicarboxylic acids, tricarboxylic acids, urea, bis-epoxides or tris-epoxides, diisocyanates or triisocyanates, dihalogen alkylenes or trihalogen alkyls and halogen epoxides, whereby dicarboxylic acids, bis-epoxides and halogen epoxides are preferred, such as terephthalic acid, biphenyl dicarboxylic acid, ethylene glycol diglycidyl ether, 1,12-bis-(5-norbornene-2,3-dicarboximido)-decane dicarboxylic acid and epichlorohydrin, whereby ethylene glycol diglycidylether, 1,12-bis-(5-norbornene-2,3-dicarboximido)-decane dicarboxylic acid and epichlorohydrin are more preferred. In an embodiment of the invention in hand, the cross-linking agent is preferably a linear molecule with a length between 3 and 20 atoms.

The polymer used in step (a) is preferably a polymer which contains hydroxyl or amino groups, and preferably one hydroxyl group or amino group per repeat unit. A repeat unit is the smallest unit of a polymer which repeats at periodic distances along the polymer chain. An example of such a polymer containing hydroxyl groups is polyvinyl alcohol. Polymers containing amino groups are preferably polymers which contain primary and/or secondary amino groups. It may be a polymer made of the same repeat units, but it may also be a co-polymer which preferably contains simple alkene monomers or polar, inert monomers such as vinylpyrrolidone as co-monomers.

Examples of polymers containing amino groups are the following: polyamines, such as any polyalkylamines, e.g. polyvinylamine, polyalkylamine, polyethylenimine and polylysine, etc. From these, polyalkylamines are preferred, even more preferred polyvinylamine and polyallylamine, whereby polyvinylamine is particularly preferred.

The preferred molecular weight of the polymer used in step (a) of the invention in hand is preferably in the range from 5,000 to 50,000 g/mol, which is true in particular for the polyvinylamine indicated.

The dissolving out of the inorganic carrier material in step (c) means that the inorganic carrier material is removed from the composite particles made of porous inorganic carrier material and the polymer applied obtained after step (b). Step (c) of the dissolving out of the inorganic carrier material to obtain the porous particles from a cross-linked polymer is preferably carried out in an aqueous alkaline solution with a pH greater than 10, more preferably a pH greater than 11, even more preferable a pH greater than 12. Here, preferably an alkali hydroxide, more preferably potassium hydroxide or sodium hydroxide, even more preferably sodium hydroxide, is used as base. Here, it is preferred that the concentration of the alkali hydroxide in the aqueous solution is at least 10 percent by weight, even more preferably 25 percent by weight, with reference to the total weight of the solution. In the process, the particles obtained in step (b) are brought in contact with the respective aqueous alkaline solution for several hours in step (c) of the method according to the invention. Then the dissolved inorganic carrier material is washed with water from the porous particles from the cross-linked polymer so that the inorganic carrier material is for the most part no longer contained in the product. The advantage of this is that with the use of the porous particles produced according to the invention from a cross-linked polymer, for example as binding material of metals, it only just consists of organic material and therefore can be burnt completely and without residue, respectively, while the metals are preserved and recovered, respectively.

Furthermore, the cross-linked polymer can be derivatized in its side groups after step (c). An organic group is preferably bound to the polymer in the process. This group may be any conceivable group, such as an aliphatic or aromatic group, which may also contain heteroatoms. These groups may also be substituted with anionic or cationic groups and groups which can be protonated or deprotonated, respectively. If the cross-inked porous polymer obtained according to the method according to the invention is used to bind metals from solutions, the group with which the side groups of the polymer are derivatized is a group which has the characteristics of a Lewis base. Organic groups with the characteristics of a Lewis base are in particular groups which form a complex bond with the metal to be bound. Organic groups which have a Lewis base are, for example, ones which have heteroatoms with free electron pairs, such as N, O, P, As or S.

Preferred organic groups for the derivatization of the polymer are the following ligands presented below:

| Name | Structure of the ligand on the polymer |
|---|---|
| 6-amino-nicotinic acid groups | PolymerN-C(=O)-pyridine-NH$_2$ (6-amino nicotinamide attached via amide) |
| Arginine groups | PolymerN-C(=O)-CH(NH$_2$)-CH$_2$CH$_2$CH$_2$-NH-C(NH$_2$)=NH (arginine amide) |
| Succinic acid-N-methyl-piperazine | PolymerN-C(=O)-CH$_2$CH$_2$-C(=O)-N(piperazine)N-CH$_3$ |
| 4-[(4-aminopiperazine-1-yl)amino]-4-oxobutyric acid groups | PolymerN-C(=O)-CH$_2$CH$_2$-C(=O)-NH-N(piperazine)N-CH$_3$ |
| Succinic acid groups | Polymer-N-C(=O)-CH$_2$CH$_2$-C(=O)-OH |
| Creatine groups | PolymerN-C(=O)-CH$_2$-N(CH$_3$)-C(=NH)-NH$_2$ |
| Diaminobicyclooctane carboxylic acid | PolymerN-C(=O)-diazabicyclooctane |
| Diethylene triamine | PolymerN-CH$_2$CH$_2$-NH-CH$_2$CH$_2$-NH$_2$ |
| Diglycoloc acid groups | PolymerN-C(=O)-CH$_2$-O-CH$_2$-C(=O)-OH |
| Ethylene diamine tetraacetic acid groups Binding to 1-4 acid groups possible | Polymer-NH-C(=O)-CH$_2$-N(CH$_2$COOH)-CH$_2$CH$_2$-N(CH$_2$COOH)$_2$ |

| Name | Structure of the ligand on the polymer |
|---|---|
| Ethylphosphonylcarbonyl group | 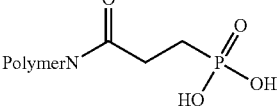 |
| N-ethanethiol group | 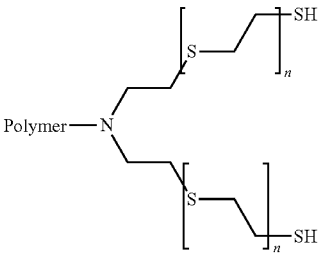<br>n ≥ 0 |
| N,N-diacetic acid groups<br>The chloracetic acid can mono- or di-substitute the amino group | 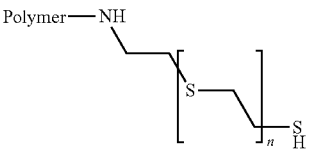 |
| 4-aminobutyric acid groups | 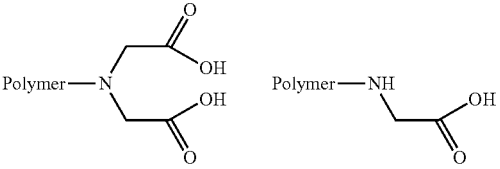 |
| Glutaric acid groups | 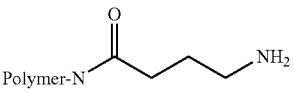 |
| 4-piperidine carboxylic acid groups | 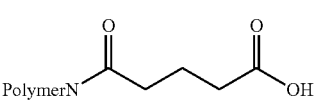 |
| 4-imidazolylacetyl groups | 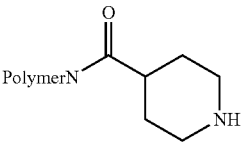 |
| 4-imidazolyle acrylic acid groups | 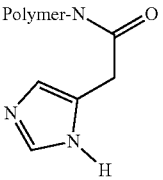 |

-continued
| Name | Structure of the ligand on the polymer |
|---|---|
| Isonicotinic acid groups | 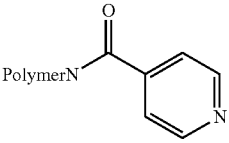 |
| Lysine acid groups | 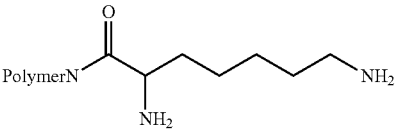 |
| Methylthiourea groups | 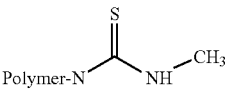 |
| Nitrilotriacetic acid<br>Binding is achieved through<br>1-3 carboxylic acid groups | 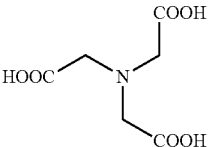 [SMILES: O=C(O)CN(CC(=O)O)CC(=O)O] |
| Phosphoric acid group<br>Can have a cross-linking effect. | 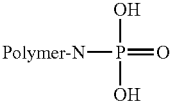<br>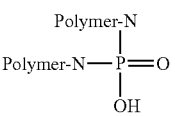<br>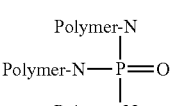 |
| Proline | 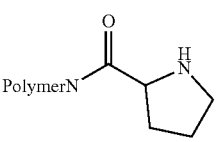 |
| Purine-6-carboxylic acid groups | 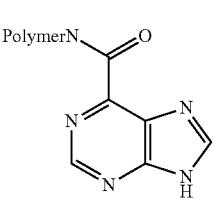 |
| Pyrazine-2-carboxyclic acid groups | 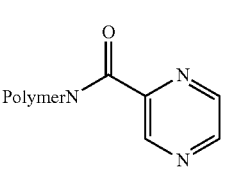 |

-continued

| Name | Structure of the ligand on the polymer |
|---|---|
| Thymine-N-acetic acid groups | [structure: thymine attached via N-CH2-C(=O)- to PolymerN] |
| Theophyllin-7-acetic acid groups | [structure: theophylline attached via N-CH2-C(=O)- to PolymerN] |
| Citric acid groups | [structure: citric acid attached via amide to PolymerN, with HO-C(=O)-CH2-C(OH)(-C(=O)-NHPolymer)-CH2-C(=O)-OH] |

The ligands PVA, i.e. the amino group of PVA, NTA, EtSH, MeSH, EDTA and iNic or combinations of the mentioned ones, are particularly preferred. For example, a combination of PVA with NTA or EtSH is particularly preferred.

The use of polyvinylamine as polymer in the method according to the invention is particularly preferred because the amino groups of the polyvinylamine themselves are Lewis bases and in addition can easily be coupled with a molecule with an electrophile centre due to their property as nucleophile groups. There, coupling reactions are used preferably during which a secondary amine and not an amide is formed because the Lewis basicity is not completely lost through the formation of a secondary amine.

The invention in hand also concerns porous particles, from a cross-linked polymer, which can be obtained through the method above according to the invention. Here, it is preferred that the particles produced according to the method according to the invention have a maximum swelling factor in water of 300%, assuming that a value of 100% is true for the dry particles. In other words, the particles according to the invention can gain maximum three times their weight in water.

Another object of the application in hand also comprises porous particles from a cross-linked polymer containing hydroxyl or amino groups, whereby these particles also have a maximum swelling factor of 300%, assuming that the percentage of dry particles is 100%. In other words, these porous particles according to the invention can also gain maximum three times their volume when swelling in water.

However, it is even more preferred that the particles produced according to the method according to the invention and the particles according to the invention, respectively, have a maximum swelling factor in water of 250%, even more preferred 200%, and most preferred 150% because otherwise the rigidity of the particles obtained is not sufficiently great at least for chromatographic applications under pressure.

The porous particles produced according to the method according to the invention and the porous particles according to the invention preferably consist of a cross-linked polymer which contains amino groups. The polymer which contains amino groups and the porous particles comprised of it, respectively, preferably has/have a concentration determined by means of titration of the amino groups of at least 800 µmol/ml, more preferably at least 1000 µmol/ml, and even more preferably at least 1200 µmol/ml. The concentration determined by means of titration of the amino groups is the concentration which is obtained according to the analytical methods indicated in the example part of this application through a breakthrough measurement with 4-toluenesulfonic acid.

The particles produced according to the invention and the particles according to the invention, respectively, preferably have a dry bulk density in the range from 0.25 g/ml to 0.8 g/ml, more preferably from 0.3 g/ml to 0.7 g/ml. In other words, the porous particles are on the whole extremely lightweight particles, which is ensured by the high porosity obtained. Despite the high porosity and the small weight of the particles, these have a relatively great mechanical strength and rigidity, respectively, and can also be used in chromatographic applications as phases under pressure.

The mean pore size of the porous particles produced according to the invention or according to the invention determined by means of inverse size-exclusion chromatography is preferably in the range from 1 nm to 100 nm, more preferably 2 nm to 80 nm.

The porous particles produced according to the invention and the porous particles according to the invention, respectively, are preferably particles which have a shape similar to the one the extracted porous inorganic carrier material had, but provided that the porous particles according to the invention and produced according to the invention, respectively, reflect the pore system of the extracted porous inorganic carrier material with their material for the most part, i.e. they are the inverse pore image of the porous inorganic carrier material used in the event of ideal pore filling in step (b) of the method according to the invention. The porous particles according to the invention and produced according to the invention, respectively, preferably have a spherical shape for the most part. Their mean particle size is preferably in the range from 5 µm to 1000 µm, more preferably in the range from 20 to 300 µm.

Furthermore, the porous particles produced according to the invention and according to the invention, respectively, from the cross-linked polymer are characterized in that they are comprised by the cross-linked polymer for the most part. In this case, "for the most part" means that only unavoidable residues, for example of inorganic carrier material, may still be contained in the porous particles, the portion of which is, however, preferably less than 2000 ppm, even more preferably 1000 ppm and most preferably 500 ppm. In other words, it is preferred that the porous particles according to the invention and producible according to the invention from the cross-linked polymer are for the most part free from an inorganic material, such as the material of the inorganic carrier material. That is also meant further above in connection with step (c) of the method according to the invention when it is discussed that the inorganic carrier material is no longer contained in the product for the most part.

The invention in hand also concerns a composite material which contains the porous particles according to the invention and produced according to the invention, respectively, dispersed in a continuous aqueous phase, whereby the continuous aqueous phase is embedded in a hydrogel and/or is part of a hydrogel and/or is surrounded by a water-insoluble, ion-permeable envelope.

The composite material according to the invention preferably exists in such a manner that the porous particles according to the invention and the porous particles produced according to the invention, respectively, are present in a continuous aqueous phase, embedded in a hydrogel.

In the case in hand, we understand by hydrogel a polymer which contains a solvent (preferably water), but is soluble in solvent, and the molecules of which are connected chemically, e.g. through covalent or ionic bonds, or physically, e.g. through looping of the polymer chains, into a three-dimensional network. Due to integrated polar (preferably hydrophile) polymer components, they swell in the solvent (preferably water), resulting in a considerable increase in volume, but without losing their cohesion in terms of substance.

The composite material according to the invention preferably has the form of particles which can be spherical, lenticular or bacillar, whereby lenticular particles are preferred. The lenticular particles preferably have a mean diameter in the range from 1 mm to 10 mm crosswise and a mean height in the range from 100 µm to 1000 µm.

The hydrogel which contains the continuous aqueous phase of the porous particles according to the invention and produced according to the invention, respectively, may be any conceivable hydrogel, whereby a hydrogel on the basis of an organic polymer is preferred. The organic polymer of which the hydrogel is comprised is preferably one which has a multitude of hydroxyl groups. In a very special embodiment of the invention in hydrogel is formed by a polymer on the basis of polyvinyl alcohol.

The composite material according to the invention is preferably produced with a method which comprises the following steps:
(a) Preparation of an aqueous solution which contains a polymer able to form a hydrogel, and an accessory agent;
(b) Adding of porous particles according to the invention and porous particles produced according to the invention, respectively, to the aqueous solution;
(c) Extracting of water from the aqueous solution from step (b) down to a water content of maximum 50 percent by weight with reference to the total quantity of the aqueous solution after water extraction, whereby a phase separation into an aqueous phase containing the accessory agent and a phase containing the polymer able to form a hydrogel in the form of a hydrogel is carried out, whereby the hydrogel contains the porous particles; and
(d) Separating of the two phases to obtain the composite material.

The polymer able to form a hydrogel is preferably an organic polymer which contains a multitude of hydroxyl groups. The use of polyvinyl alcohol is particularly preferred here.

The concentration of the polymer able to form a hydrogel in the aqueous solution in step (a) is preferably in the range from 4 to 30 percent by weight, more preferably 6 to 16 percent by weight, with reference to the total weight of the aqueous solution.

The accessory agent used in step (a) is preferably one whose affinity to water is at least comparable with the affinity to water of the polymer able to form a hydrogel. Examples of the accessory agent used in step (a) of the method according to the invention are cellulose esters, cellulose ethers, starch esters, starch ethers, polyalkylene glycol ether, polyalkylene glycols, long-chained alcohols (n≥8), sucrose esters and sucrose ethers, whereby polyethylene glycol is preferred as accessory agent.

The accessory agent used in step (a) of the method according to the invention is preferably used in a concentration in the range from 4 to 20 percent by weight, more preferably 6 to 10 percent by weight, with reference to the total weight of the aqueous solution.

In a preferred variant, the extraction of the water (step c) can also be carried out down to a residual water content of 10 to 30 percent by weight. The extraction of water from the aqueous solution is preferably carried out after pouring of the solution into a mould which preferably contains precisely the desired shape of the composite materials to be obtained.

After the separation of the two phases in step (d), a composite material is obtained, which is then left to swell up again preferably in tap water or a saline solution.

As an alternative to the above-mentioned method according to the invention for producing a composite material, it can also be produced using an alternative method with the following steps:
(a) Dispersing of the porous particles according to the invention and the porous particles produced according to the invention, respectively, in an aqueous phase containing a cross-linking agent, a hydrogel precursor which can be cross-linked with a cross-linking agent, or a hydrogel precursor which can be cross-linked thermally, to obtain a dispersion;
(b) Creation or a composite material from the dispersion obtained from (a), whereby
  (b1) the dispersion containing a cross-linking agent is, for encapsulation with a largely water-insoluble, ion-permeable envelope, introduced into a solution containing a gel precursor, which car be cross-linked with the cross-linking agent, of a water-insoluble, ion-permeable envelope material, or (b2) the dispersion containing a hydrogel precursor which can be thermally cross-linked through heat or cold is introduced, for the formation of discrete gel particles, in a Liquid phase which has a temperature that is sufficiently high or ow for the thermal cross-linking of the gel precursor, or (b3) the dispersion containing a hydrogel precursor which can be cross-linked with a cross-linking agent is introduced in the solution containing the cross-linking agent, or the cross-linking agent is incorporated in the dispersion.

Another embodiment of the invention in hand concerns the use of the porous particles according to the invention and the porous particles produced according to the invention, respectively, as well as the composite material according to the invention for purifying organic molecules or separating metal-containing ions from solutions. Here, the porous particles according to the invention and the porous particles produced according to the invention, respectively, are preferably used in chromatographic methods which enable the purification of organic molecules or the separation of metal-containing ions from solutions, more preferably the purification of organic molecules. The composite material according to the invention is preferably used to separate metal-containing ions from solutions and can, for example, be used in an easy manner in a stirred tank in a "fluidized bed" application, respectively, in the scope of which the composite material is simply added to a metal-containing solution and agitated for a certain period of time, whereby the metal-containing ions from the solution settle in the composite material.

In the scope of the use according to the invention, it way additionally be preferred that the composite material merely consisting of organic material and the porous particles respectively, is/are burnt without residue after their use for the binding of metals for the recovery of the metals so that the metals can be recovered in that way.

In other words, the invention in hand also concerns a method for purifying organic molecules or for separating metal-containing ions from solutions, whereby a solution is brought in contact with a porous particle according to the invention and a porous particle produced according to the invention, respectively, or a composite material according to the invention.

According to the invention, the solutions from which metal-containing ions are to be bound may be concentrated or diluted aqueous or non-aqueous, acid, alkaline or neutral solutions.

The metal-containing ions which are to be extracted and bound, respectively, from these solutions according to the invention are preferably metals which are present in ionic form (metal ions) and also as metal-ligand coordination compounds in ionic form, respectively, in the above-mentioned solutions. The metals are preferably complex-forming metals, i.e. metals which can form a metal-ligand coordination bond. The metals transition metals and rare earth metals, respectively, are more preferred, even more preferred precious metals and rare earths, respectively. The metals copper, nickel and chromium are most preferred.

In another embodiment of the use according to the invention, the solutions from which the metal-containing ions are to be bound are solutions which have a salt content of alkaline ions of at least 5 g/l.

Furthermore, the solutions from which the metal-containing ions are to be bound are preferably aqueous solutions, in particular also an acid aqueous solution with a pH value of ≤5, more preferably ≤4, and even more preferably ≤3.

The invention in hand also concerns a filter cartridge, for example for the purification of drinking water, which contains porous particles according to the invention from a cross-linked polymer or the composite material according to the invention. However, the filter cartridge according to the invention preferably contains the composite material according to the invention. The filter cartridge is preferably designed in such a way that the drinking water to be purified can pass through the cartridge and come in contact inside of it with the porous particles according to the invention from a cross-linked polymer or the composite material according to the invention, whereby metal-containing ions are removed from the water.

In addition, the filter cartridge may contain a material for the removal of micro-pollutants. For that, activated carbon is used preferably. Here, the different materials can be arranged in separate zones within the filter cartridge, or in a mix of the two materials.

The filter cartridge may be designed in all conceivable sizes. For example, the filter cartridge can be designed in a size which is sufficient for the daily drinking water demand of one household. However, the filter cartridge can also have a size which allows to cover the drinking water demand of several households, i.e. a demand of more than 5 litres daily, for example.

In order to enable the removal of suspended matter from the water in addition to metal-containing ions and micro-contaminants, the filter cartridge may also contain a membrane which filtrates suspended matter.

Now the invention in hand is to be illustrated based on the following figures and examples, which are only to be deemed exemplary, however:

Images in the figures:

FIG. 1 shows a photographic image of porous particles of a cross-linked polymer according to the invention.

Figure 2:
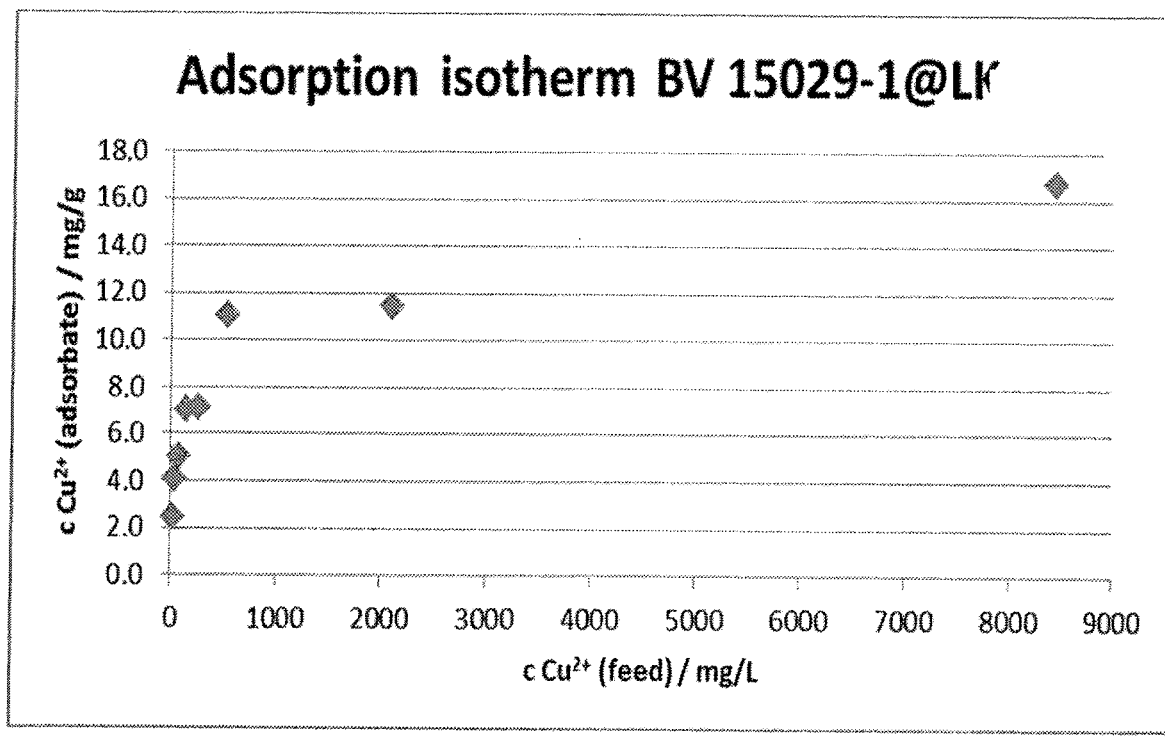
FIG. 2 shows an isotherm with the bound quantity of $Cu^{2+}$ as a function of the $Cu^{2+}$-concentration in solution.

FIG. 2 shows an isotherm with the bound quantity of $Cu^{2+}$ as a function of the $Cu^{2+}$-concentration in solution.

In addition, FIGS. 3-10 show measurement results from the application tests.

EXAMPLES

Analytic Methods:

Determination of the concentration of the amino groups of a sorbent with breakthrough measurement with 4-toluene-sulphonic acid (titration analysis):

The dynamic anion exchange capacity is determined with a column of the stationary phase to be tested. For that purpose, all exchangeable anions in the column are first exchanged with trifluoroacetate. Then the column is flushed with an aqueous reagent solution of toluene-4-sulfonic acid until this solution comes out in the same concentration at the end of the column (breakthrough). The quantity of toluene-4-sulfonic acid bound by the column is calculated from the concentration of the toluene-4-sulfonic acid, the flow rate and the area of the breakthrough in the chromatogram. The quantity of toluene-4-sulfonic acid determined in that way indicates the concentration of the amino groups of the sorbent.

The dynamic anion replacement capacity for toluene-4-sulfonic acid in water refers to the phase volume and is indicated in mmol per litre (mM/l).

Example 1: Production of Porous Particles from a Cross-Linked Polymer According to the Invention First, a silica gel carrier is coated with polyvinylamine several times as follows:

1$^{st}$ Coating 5000 g silica gel M.S Gel D50-120A (WAC 1.08 ml/g) are filled in the 20 litre drum of a Lödige VT 20 ploughshare mixer. In parallel to that, a polyvinylamine polymer solution is prepared. For that purpose, 4946 g of a 10.1% aqueous polyvinylamine solution (PVA solution) are weighed out. By adding 245 g of 32% hydrochloric acid, the pH value of the polymer solution is adjusted to 9.5. Then 243 g of water are added. This PVA solution is slowly added to the silica gel in the mixing drum (rotational speed of the mixing device 120 rpm) within 30 min. Then the coated silica gel is mixed for another 30 min. The coated polymer adsorbate is stored at room temperature for 24 h. The drum of the ploughshare mixer is heated to 60 C. Then the solvent is dried in the Lödige dryer at 30 mbar for weight constancy. The yield is 5573 g of polymer adsorbate.

2$^{nd}$ Coating

The dried polymer adsorbate (5573 g) is coated in the mixing drum of the Lödige VT 20 ploughshare mixer a second time. For the preparation of the polymer solution for the coating, 3956 g of 12.6% PVA solution are weighed out and the pH of the solution is adjusted to 9.5 by adding 278 g of 32% hydrochloric acid. Then 704 g of water are added. The coating solution is added to the polymer adsorbate in the drum of the ploughshare mixer (rotational speed 120 rpm) with a peristaltic pump within 30 min. The polymer adsorbate is mixed for 30 min. and then stored for 24 h. The drum of the ploughshare mixer is heated to 60° C. The moist polymer adsorbate is dried in the Lödige dryer at reduced pressure (30-50 mbar) for weight constancy. The yield is 6115 g of polymer adsorbate.

3$^{rd}$ Coating

The dried polymer adsorbate (6115 g) is coated in the mixing drum of the Lödige VT 20 ploughshare mixer once more. For the preparation of the polymer solution for the coating, 3967 g of 12.6% PVA polymer solution are weighed out and the pH value of the solution is adjusted to 9.5 by adding 264 g of 32% hydrochloric acid. Then 204 g of water are added. The coating solution is added to the polymer adsorbate in the drum of the ploughshare mixer (rotational speed 120 rpm) with a peristaltic pump within 30 min. The polymer adsorbate is mixed for 30 min and then stored for 24 h. The drum of the ploughshare mixer is heated to 60° C. The moist polymer adsorbate is dried in the Lödige dryer under reduced pressure (30-50 mbar) for weight constancy. The yield is 6670 g of polymer adsorbate.

Cross-Linking of the Polymer and Dissolving of the Carrier:

500 g polymer adsorbate are weighed out into a 2 litre flask. Then 1.29 g of epichlorohydrin dissolved in 200 ml of 2-propanol are added and the powder is mixed at 60° C. for 24 h. Then 1 l of 25% sodium hydroxide solution is added and the suspension is mixed for 4 h. The suspension obtained is washed with the following solvents on a filter frit: 2 l of 1 M sodium hydroxide solution, 2 l of purified water, 2 l of 2 M hydrochloric acid in water, 2 l of purified water, 4 l of 1 M sodium hydroxide solution, 4 l of water.

Yield: 1 l template phase (MetCap T-phase, PVA phase)

Anion capacity: 1808 mM/ml

FIG. 1 shows a photographic image of the porous polymer cross-linked according to the invention in particulate form with a diameter between 10 and 50 μm.

Example 2: Production of a Composite Material According to the Invention

Lenticular gel elements according to DE 198 27 552 C1 which contain the cross-linked porous polymer according to Example 1 are produced.

Example 3: Use of the Composite Material According to the Invention for the Separation of Metals from Solutions For the reduction of the of Cu content of aqueous solution, 1 ml of a suspension which contains 50 mg of the lenticular gel elements according to example 2 is incubated with 2.5 ml aqueous $Cu^{2+}$-solution for 24 h. The supernatant of the solution is removed and analysed by means of FAAS. Table 1 shows the bound quantity of $Cu^{2+}$. FIG. 2 shows an isotherm with the bound quantity of $Cu^{2+}$ as a function of the Cu-concentration in solution.

TABLE 1

| Concentration of $Cu^{2+}$ in solution [mg/L] | Concentration of bound $Cu^{2+}$ [mg/g] | Concentration of bound $Cu^{2+}$ [%] |
| --- | --- | --- |
| 16.15 | 2.4 | 99.1 |
| 34.66 | 4.1 | 77.5 |
| 70.34 | 5.0 | 47.3 |
| 135.72 | 7.0 | 34.2 |
| 262.40 | 7.1 | 17.9 |
| 531.78 | | 15.9 |
| 527.77 | 11.0 | 13.8 |
| 2099.82 | 11.4 | 3.6 |
| 4230.69 | | |
| 8434.54 | 16.7 | 1.3 |

APPLICATION EXAMPLES A1-A11

Example A1: Drinking Water Application/Combination of Different Phase Types in a Cartridge (Source: HV 16012)

For drinking water purification, several MetCap T-phase types are combined (at least 2, PVA base phase and NTA) to cover a range of the heavy metal spectrum which is as wide as possible effectively and reliably.

Experimental Set-Up:

98 mg $CuSO_4 \times 5H_2O$ and 101 mg $NiCl_2 \times 6H_2O$ are added to 50 l of drinking water and mixed intensively to achieve a concentration of 5 ppm each of the heavy metal. With a flow rate of 45 ml/min (2.7 l/h, 10 bed volume/h), the solution is then pumped through a cartridge (4.4×18 cm, slightly conical, volume: ≈274 ml) which contains MetCap T-amino base phase and MetCap T-NTA-phase. The effluent is collected in fractions. The fractions are analysed for the heavy metals with AAS or Hach-Lange cuvette test.

Hach-Lange Tests:

Copper, LCK 529, 0.01-1.0 Cu

Nickel, LCK 537, 0.05-1.0 mg/L Ni

Copper is additionally analysed with the AAS.

Figure 3:
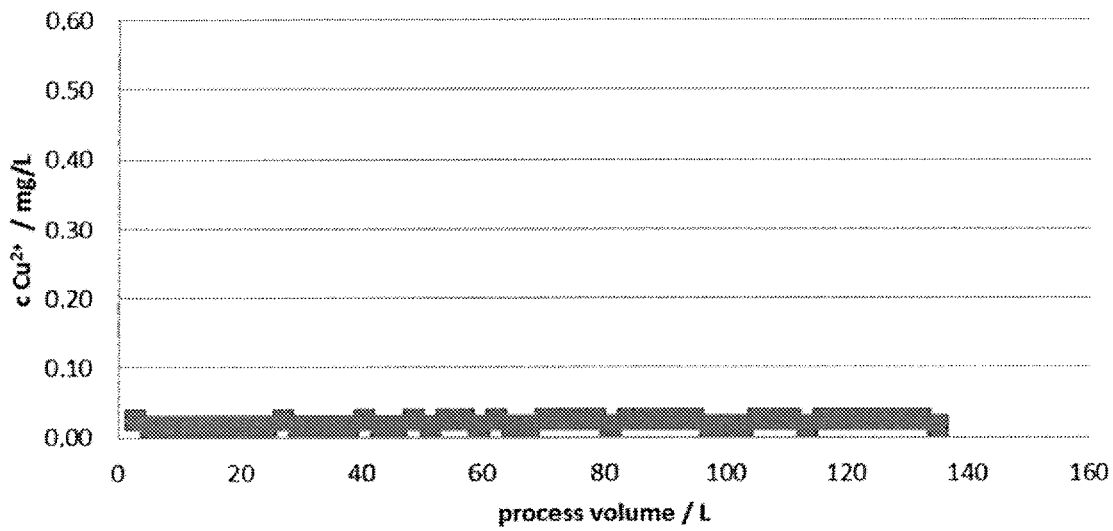
FIGS. 3-10 show measurement results from the application tests.
Figure 4:
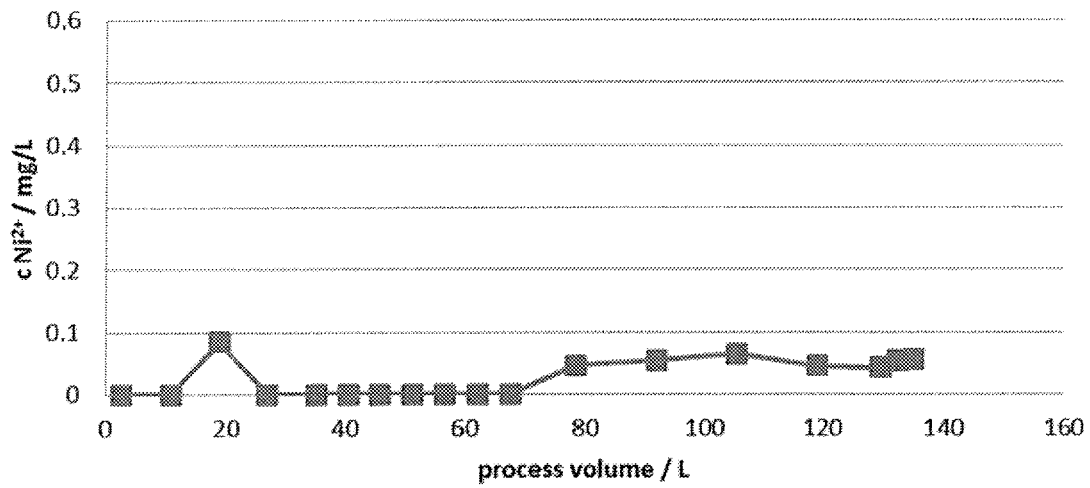

The results of the analyses are shown in FIGS. 3 and 4.

Copper as well as nickel with an initial concentration of 0.5 ppm each in tap water are considerably reduced across the complete period of observation, partly below the detection limit of the analytical methods.

Example A2: Drinking Water Application/Combination of Different Phase Types in a Cartridge The capacity determination of the drinking water cartridge with concentrated copper solution shows a very high loadability per ml and also works with different flow rates. A decrease in capacity with increasing flow rate is not observed.

Experimental Set-Up:

A solution of 800 ppm copper (as $CuSO_4 \times 5H_2O$) is pumped through a cartridge (4.4×18 cm, slightly conical, volume: ≈274 ml) which contains MetCap T-amino base phase and MetCap T-NTA-phase at different flow rates (10-100 bed volume per hour, BV/h). The effluent is collected in fractions. The fractions are analysed for copper with AAS.

Figure 5:
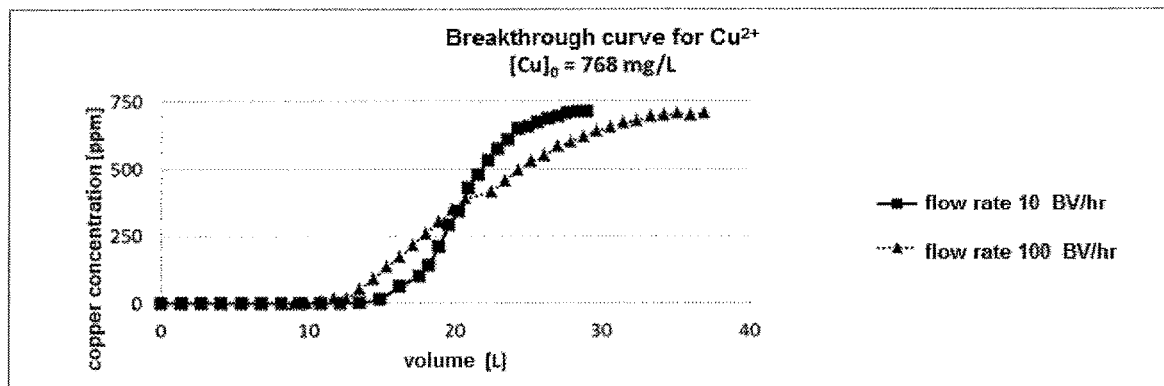

FIG. 5 shows the curve of the copper concentration in the effluent at different flow rates of 10 and 100 bed volume, respectively, per hour (BV/h)

The two curves intersect roughly at the level of the reversal point. This means that the loading capacity is independent of the flow rate. The 1% breakthrough with a flow rate of 100 BV/h is somewhat ahead of the 1% breakthrough of the flow rate of 10 BV/h. Kinetic reasons may be crucial for that. Nevertheless, the absolute capacity of the system remains unaffected.

Example A3: Universality (PSE)

Source: HV 15091

The MetCap T-phase—as amino phase, and the derivatised special phases—are characterized by an enormous breadth of application: All heavy metals can form chemical complexes. The MetCap T-phases supply the ligands for these chemical complexes and can therefore be used for all heavy metals. As alkaline and alkaline earth metal form only very weak chemical complexes as a rule, they are normally not bound. That is the essential difference as compared with ion exchangers which bind all types of charged species and are accordingly less selective.

The following data illustrate the unlimited breadth of application for this type of elements in the periodic system based on 12 representative heavy metals.

Experimental Set-Up:

100 mg of the respective phases are weighed out and mixed with 5 ml of an aqueous 10 ppm, 100 ppm and 1000 ppm solution of the respective metal salt and agitated at 20° C. for 24 K. Then the concentration of the heavy metal in the supernatant is determined with the AAS.

TABLE 2

| HV 15091 | Concentration [ppm] | Pd | Au | Ag | Cu | Pb | Zn | Pt |
|---|---|---|---|---|---|---|---|---|
| MetCap T | 10 | 0.5 | 0.0 | 0.0 | 0.0 | 0.0 | 0.3 | 0.0 |
| [BV 15047] | 100 | 1.6 | 0.0 | 0.0 | 0.0 | 0.0 | 0.0 | 0.0 |
|  | 1000 | 17.6 | 0.0 | 0.0 | 0.0 | 0.0 | 0.6 | 0.0 |

A residual concentration of metals in the supernatant is no longer detectable with the AAS in most cases. Minor residual concentrations are only found for palladium and zinc. The MetCap T-phase shows a complete binding in particular for the valuable precious metals gold, silver, copper, lead and platinum, even with an offered concentration of 1000 ppm.

Source: HV 16009

Experimental Set-Up:

100 mg of the respective phases are weighed out and mixed with 5 ml of an aqueous 10 ppm and 100 ppm solution of the respective metal salt and agitated at 20° C. for 24 h. Then the concentration of the heavy metal in the supernatant is determined with the AAS.

TABLE 3

| HV 16009 | Phase | Initial concentration | Cd | Cr | Pb | Hg | As |
|---|---|---|---|---|---|---|---|
| EP 16001 | TP 214 | 10 ppm | 0.0 | 9.8 | 2.9 | — | 8.3 |
|  |  | 100 ppm | 4.7 | 102.0 | 12.4 | 0 | 91.8 |
| BV 15069 | MetCap T | 10 ppm | 0.3 | 6.0 | 2.1 | — | −1.7 |
|  |  | 100 ppm | 1.1 | 29.9 | 0.8 | 0 | 8.8 |

TP214: Lewatit® MonoPlus TP 214 is a monodisperse, macro-porous chelating resin with thiourea groups (manufactured by Lanxess): BV 15069: MetCap T The table shows a comparison of the reduction of the content of toxic heavy metals of the MetCap T-phase and a commercial reference phase of a competitor (incubation at room temperature).

In all cases (with the exception of mercury, where both phases perform very well), the detectable remaining quantity of toxic heavy metal is smaller in the case of the MeCap T-phase than on the commercial reference gel.

Example 4: Nickel Dynamic Binding at High Concentrations

Source AL 16001

Experimental Set-Up:

An aqueous solution of 500 µm nickel (pH4) is pumped through a column filled with the respective phase (33.5×4 mm) with a flow rate of 1 ml/min. The effluent is analysed at 720 nm in a flow cell.

The results of the measurements are shown in Table 4 below:

TABLE 4

|  | PS-based comparison phases | | MetCap T phases | | |
|---|---|---|---|---|---|
|  | NH2 | NTA | NH2 | EtSH | TA |
| AL 16001 Nickel 500 pm pH4 | PV 150002 BV 14171 polystyrene amino type | PV 160116 ND 16003 polystyrene nitrilotriacetic acid type | PV 160097 BV 16016 MetCap T amino type | PV 160129 ND 160035 MetCap T ethanethiol type | PV 160130 ND 160037 MetCap T nitrilotriacetic acid type |
| DBC mg/ml | 11.34 | 10.19 | 26.86 | 27.15 | 32.16 |

The MetCap T-phases show a nickel capacity which is two to three times higher than the one of the comparable polystyrene-based (PS) phases.

Example 5: Copper Dynamic Binding in High Concentrations

HV 15090:

Peculiarity: The manner of preparation of the base phase as well as derivatizations have a great influence on the binding properties of the MetCap T-phases:

Experimental Set-Up:

An aqueous solution of 800 ppm copper (pH 5) is pumped through a column filled with the respective phase (33.5×4 mm) with a flow rate of 1 ml/min. The effluent is analysed in a flow cell at 790 nm.

h, 2 h, 3 h, 4 h, 5 h, 6 h and 24 h, and the palladium concentration is determined with the AAS.

Figure 6:
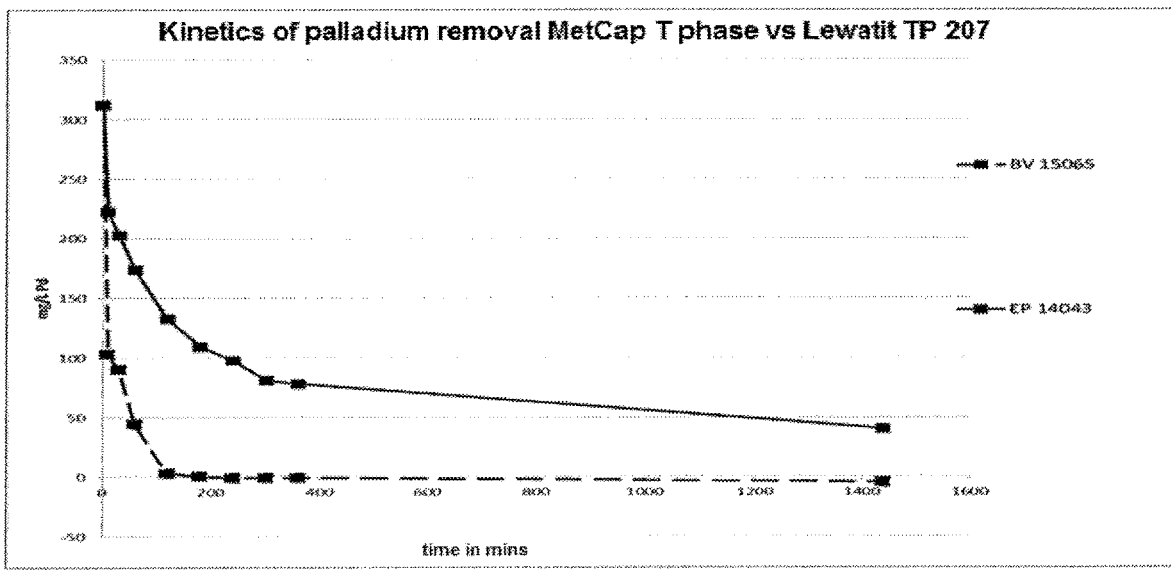

The result of the analyses is shown in FIG. 6.

BV 15065 VPVA120/50-20-ECH

EP 14043 Lewatit TP 207 (iminodiacetic acid)

After approx. 10 min, the concentration of the palladium has decreased to approx. 50% of the initial value in the case of the MetCap T incubation series. After approx. 100 min, the concentration decreases below the detection limit of the AAS in this series (lod AAS 0.25 ppm). In the case of the competitor phase, the concentration decreases much more slowly (half-life approx. 3 h) and reaches, even after 24 h, only a much higher value which indicates an incomplete binding in a finite period of time.

TABLE 5

| Cu 800 pppm pH 5 1 ml/min | PV 150679 BV 15062 MetCap T amino type | PV 150710 BV 15065 MetCap T amino type | PV 150711 BV 15067 MetCap T amino type | PV 150737 ND 150196 MetCap T methyl-thiourea type | PV 150738 ND 150197 MetCap T nitrilotriacetic acid type | PV 150739 ND 150198 MetCap T isonicotinic acid type | PV 150759 ND 150202 MetCap T ethanethiol type | PV 150760 ND 150203 MetCap T methyl-thiourea type | PV 150761 ND 150204 MetCap T nitrilotriacetic acid type | PV 150762 ND 150205 MetCap T isonicotinic acid type | PV 160007 BV 15083 MetCap T amino type |
|---|---|---|---|---|---|---|---|---|---|---|---|
| DBC mg/ml | 57.14 | 63.54 | 49.31 | 21.66 | 25.78 | 26.36 | 30.55 | 30.54 | 45.95 | 48.23 | 53.24 |

HV 15106:

Peculiarity: The introduction of certain ligands/binding groups considerably increases the binding capacity for nickel from aqueous solution:

The derivatization with EtSH, NTA and MeSHAr groups, respectively, results in an increase in loadability by 64%, 81% and 55%:

TABLE 6

| HV 15106 Nickel 500 ppm 1 ml/min | PV 150723 BV 15068 MetCap T amino type | PV 150759 ND 150202 MetCap T ethanethiol type | PV 150761 ND 150204 MetCap T nitrilotriacetic acid type | PV 150760 ND 150203 MetCap T methylthiourea type |
|---|---|---|---|---|
| DBC mg/mL | 9.76 | 16.15 | 17.63 | 15.09 |

For that reason, the technology is to be deemed a platform technology which allows an adaptation of the properties of the phases to certain tasks: For example, if nickel is to be bound from aqueous solution, derivatized phases are to be preferred over the pure amino base phase.

Example A6: Binding of Palladium Under Static Conditions from Aqueous-Organic Solution Source: HV 15097—kinetics in comparison with EP 14043 LewatitTP207 (manufacturer: Lanxess; carrier: polystyrene; ligand: iminodiacetic acid)

Peculiarity:

Due to their advantageous flow characteristics and the optimized diffusion paths, the absorption of metals is accomplished much faster with the MetCap T-phases than with conventional materials.

Experimental Set-Up:

A solution of 30 ppm palladium in water/acetonitrile/isopropanol is incubated 9 times with 100 mg each of the phases. The supernatant is removed after 10 min, 30 min, 1

The result shows that the use of the instrAction MetCap resins is not limited to purely aqueous systems.

Example A7: Dynamic Binding of Metals: Platinum, Lead, Rhodium

Source: HV 15088: platinum breakthrough

Peculiarity:

The very strong binding of the platinum (at pH 1.1) is largely reversible. In that way, the phase can be reused again and again. A recovery of the platinum is possible without burning. Due to the very strong binding, solutions with very low concentration can also be processed effectively and with a high yield (here 100%).

Figure 7:
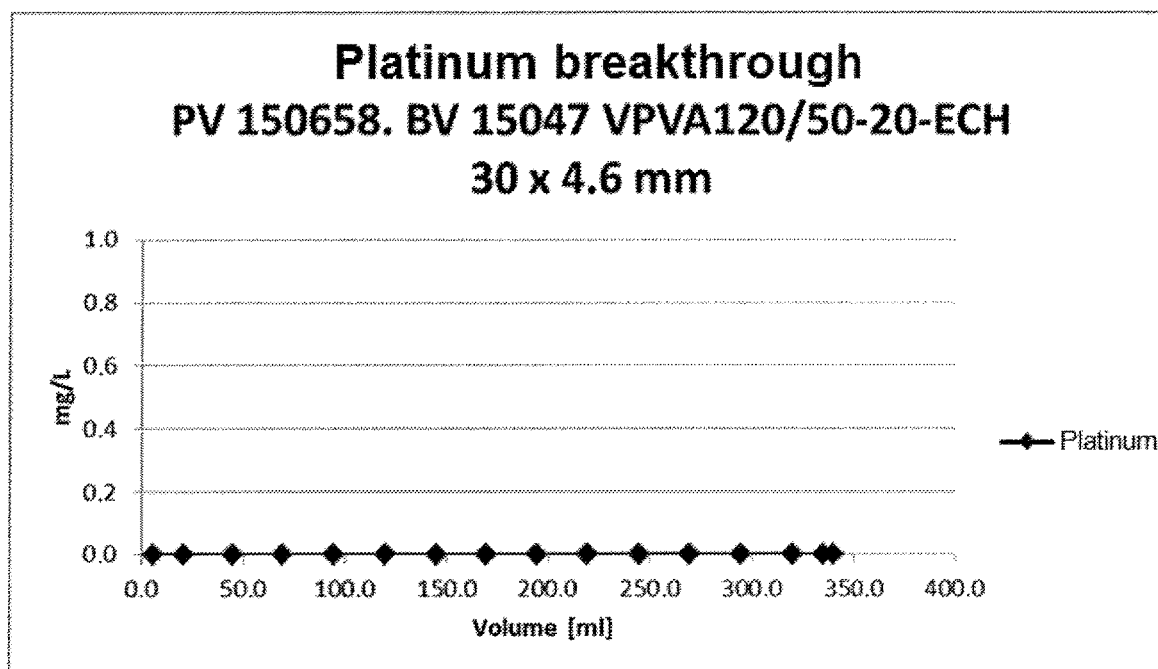

Experimental Set-Up:

A Peek column of the format 30×4.6 mm is packed with MetCap T (batch BV 15047) and flushed with a solution of approx. 60 ppm platinum water (pH 1.1) with a flow rate of 1 ml/min. The effluent is collected and analysed for platinum with AAS. The result is shown in FIG. 7.

Across the complete breakthrough volume of approx. 350 ml, no platinum was detected in the solution (limit of detection: AAS 5 ppm). Consequently, approx. 35 mg platinum were absorbed by the column. That equals >75 mg palladium/ml phase. The absorption capacity of the phase was not reached in this experiment.

77% of the bound platinum were recovered by means of elution with 50 ml 1M $HNO_3$.

Lead Breakthrough

Figure 8:
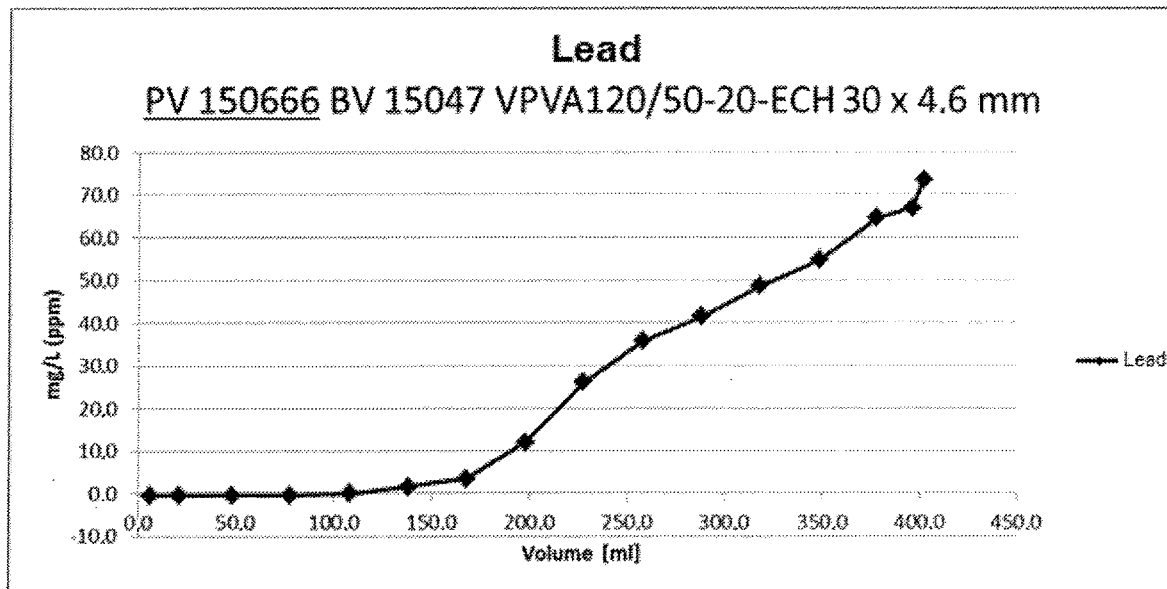

Source: HV 15086:

Experimental Set-Up:

A Peek column of the format 30×4.6 mm (0.5 ml) is packed with MetCap T (batch BV 15047) and flushed with a solution of approx. 80 ppm lead in water (pH 5) with a flow rate of 1 ml/min. The effluent is collected and analysed for lead with the AAS. The result is shown in FIG. 8.

In the first approx. 110 ml, no lead is detectable (lod AAS: 0.5 ppm). Then a creeping breakthrough sets in. The initial concentration of approx. 80 ppm is reached only after approx. 400 ml (800 bed volumes).

The bound lead cannot be eluted from the phase with 1 M $HNO_3$.

That demonstrates that the technology cannot only be used for side group elements and precious metals, but also for all elements which are able to form a complex.

Rhodium Breakthrough HV 15088

Figure 9:
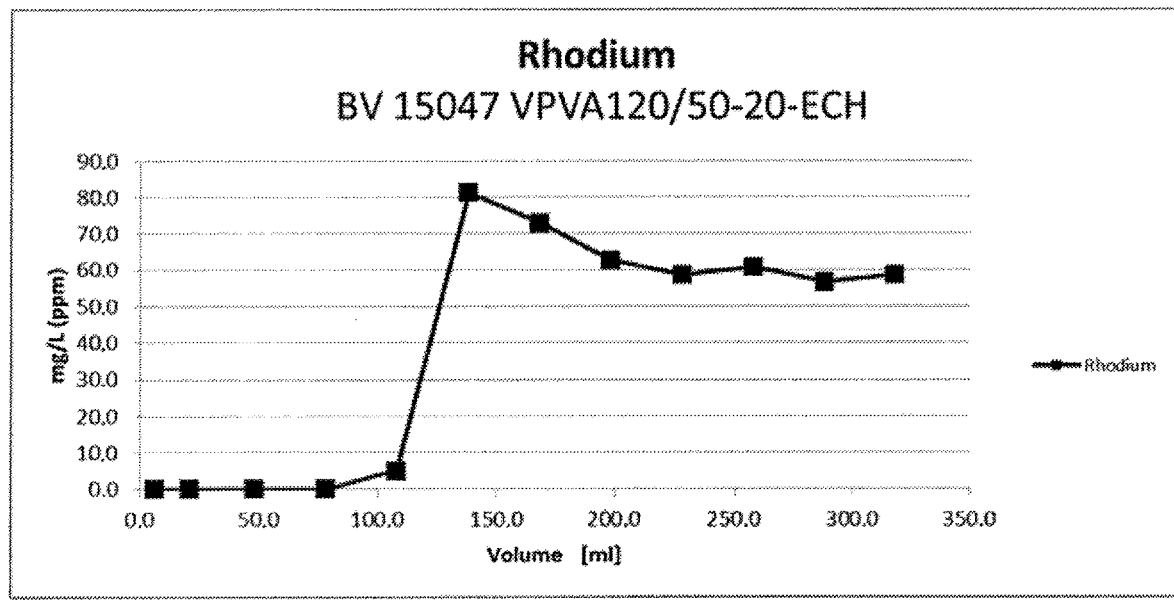

A Peek column of the format 30×4.6 mm (0.5 ml) is packed with MetCap T (batch BV 15047) and flushed with a solution of approx. 60 ppm rhodium in water (pH 5) with a flow rare of 1 ml/min. The effluent is collected and analysed for rhodium with the AAS. The result is shown in FIG. 9.

In the first approx. 110 ml (220 bed volumes), rhodium is not detectable (lod AAS: 0.5 ppm). Then a creeping breakthrough sets in. After approx. 150 ml (300 bed volumes), the initial concentration of approx. 60 ppm is reached.

No rhodium can be eluted from the phase with 1 M $HNO_3$.

Example A8: Silver from Aqueous Solution in an Agitated Tank Cascade

Source: HV 15076

To 100 mg of the individual phase, 5 ml of an aqueous silver nitrate solution are added (concentration 74.2 ppm) and agitated at 20° C. for 24 h. Then the supernatant is removed, and the silver concentration is determined with the AAS. The rest of the supernatant is again incubated with 100 mg fresh phase. This process is carried out four times in total ($1^{st}$ to $4^{th}$ cascades). The results of the AAS measurements are summarized in the table below:

TABLE 7

| HV 15078 Carrier material | ND 150125 PSS | PRC 15026 PSS | PRC 14035 PSS | ND 150091 PSS | BV 15047 Met Cap T amino type |
|---|---|---|---|---|---|
| Particle size [µm] | 500 | 500 | 35 | 35 | 50 |
| Quantity of PVA [%] | 25 | 25 | 37.5 | 15 | — |
| Ag concentration | [ppm] | [ppm] | [ppm] | [ppm] | [ppm] |
| Start | 74.2 | 74.2 | 74.2 | 74.2 | 74.2 |
| 1st cascade | 47.2 | 61.0 | 45.3 | 61.9 | 22.4 |
| 2nd cascade | 32.8 | 31.4 | 21.3 | 39.2 | 2.4 |
| 3rd cascade | 22.3 | 25.1 | 9.9 | 24.1 | 0.0 |
| 4th cascade | 18.9 | 14.6 | 6.9 | 16.1 | 0.0 |
| After 96 hrs without exchange | 30.7 | 37.6 | 43.2 | 69.4 | 24.3 |

Table 7 shows that the MetCap T-phase (last column) is the only one of the analysed phases which can reduce the silver content completely under the detection limit of the AAS within three cascades. After only the second cascade, >97% of the silver are bound. That demonstrates the superiority of the MetCap T-materials as compared with polystyrene-based phases: Even 35 µm particles (columns 3 and four) showed slower kinetics and less absolute capacity than the 50 µm MetCap T-phase.

Example A9: Copper in the Presence of Phosphate

Source: HV 15094

To 100 mg of the individual phases, 5 ml each of an aqueous 10% phosphoric acid solution previously adjusted to pH 3 with sodium hydroxide solution and 10 and 100 ppm iron and aluminium each, respectively, are added, and agitated at 20° C. for 24 h. Then the concentration of the metal in the supernatant is determined with the AAS.

TABLE 8

| HV 15094 MetCap T amino type | Initial concentration [ppm] | Fe [ppm] | Al [ppm] |
|---|---|---|---|
| 10% H3PO4, pH 3 | 10 | 0 | 2.1 |
| 10% H3PO4, pH 3 | 100 | 0 | 11.3 |

The reduction of the iron content of phosphate-containing aqueous solution is, independently of the concentration, completely under the detection limit (0.5 ppm) with one stage. For aluminium, a content reduction of ~80-90% is found with one stage.

Example A10: Manganese, Nickel, Aluminium in Aqueous, Concentrated Saline Solution (0-2 M NaCl)

Particularity:

The removal of critical heavy metals from concentrated saline solutions is very successful with the MetCap phase. That opens up wide areas of application, such as desalination of sea water and chlor-alkali electrolysis, respectively. In both cases, the main benefit is the removal of the heavy metals which damage the sensitive membranes used for both methods.

Source: HV 15095

Experimental Set-Up:

Three solutions each of manganese (10 ppm), aluminium (100 ppm) and nickel (10 ppm) are prepared in 0 M, 1 M, 2 M NaCl solution (9 solutions in total). 5 ml each of this solution are agitated with 100 mg of the MetCap T at 20° C. for 24 h. Then the supernatant is removed and the metal concentration in the supernatant is determined with the AAS.

TABLE 9

| [NaCl] Initial concentration | Manganese [ppm] 10 | Aluminium [ppm] 100 | Nickel [ppm] 10 |
|---|---|---|---|
| 0 M | — | 2 | 0 |
| 1 M | 0 | 5 | 0 |
| 2 M | 0 | 14 | 0 |

The table shows that manganese and nickel are removed completely from solutions, independently of their salt content, below the detection limit of the AAS (limit of detection: manganese: 0.1 ppm, nickel: 0.1 ppm). The concentration of aluminium is strongly reduced, by 86-98%.

Therefore, the MetCap T-phase binds heavy metals independently of their salt content. Light metals such as aluminium are bound or partially bound to 86-98%, respectively, under these conditions.

Example A11: Regenerability

Particularity:
The MetCap T-phases can be re-used in a large number of use cases without a decrease in capacity and selectivity or alteration of other properties (such as back pressure):
Source: HV 16025
Experimental Set-Up:
An aqueous solution of 500 ppm nickel (pH4) is pumped through a column filled with the respective phase (33.5×4 mm) with a flow rate of 1 ml/min. The effluent is analysed at 720 nm in a flow cell. Regeneration: 80 ml 0.5 M HCl, followed by 80 ml 0.5 M NaOH.

Figure 10:
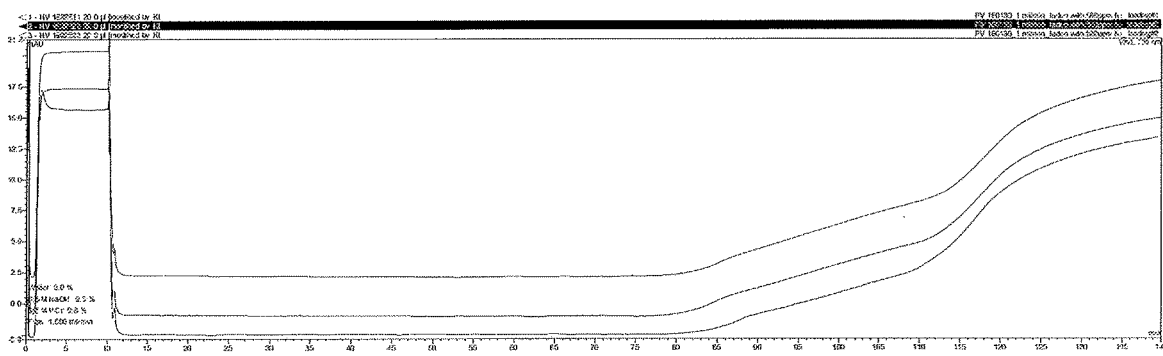

In FIG. 10, three breakthroughs obtained in the manner described above are laid on top of one another.

The distinctive points in the chromatogram (0%, 50%, 100 W breakthrough) indicates the unchanged capacity and the identical behaviour of the regenerated phase. The absolute amount of the absorption is caused by variations on the detector.

A $1^{st}$ aspect of the invention in hand is a method for producing porous particles from a cross-linked polymer, which comprises the following steps:
(a) Application of an organic polymer onto a porous inorganic carrier material in particulate form;
(b) Cross-linking of the polymer in the pores of the inorganic carrier material; and
(c) Dissolving out of the inorganic carrier material to obtain the porous particles from a cross-linked organic polymer.

A $2^{nd}$ aspect of the invention in hand is a method according to aspect 1, wherein in step (a) the portion of polymer is at least 5 percent by weight, with reference to the weight of the porous inorganic carrier material without polymer.

A $3^{rd}$ aspect of the invention in hand is a method according to aspect 1 or 2, wherein in step (b) the polymer is cross-linked to a degree of cross-linking of at least 10%, with reference to the total number of the cross-linkable groups of the polymer.

A $4^{th}$ aspect of the invention in hand is a method according to one of the aspects 1 to 3, wherein the porous inorganic carrier material is a material which can be dissolved under aqueous-alkaline conditions at pH>10.

A $5^{th}$ aspect of the invention in hand is a method according to one of the aspects 1 to 4, wherein the porous inorganic material is one on the basis of silica gel.

A $6^{th}$ aspect of the invention in band is a method according to one of the aspects 1 to 5, wherein the polymer from step (a) is a polymer containing hydroxyl or amino groups.

A $7^{th}$ aspect of the invention in hand is a method according to one of the aspects 1 to 6, wherein the cross-linked polymer is derivatized in its side groups according to step (c).

An $8^{th}$ aspect of the invention in hand consists of porous particles from a cross-linked polymer which can be obtained according to a method according to one of the aspects 1 to 7.

A $9^{th}$ aspect of the invention in hand consists of porous particles according to aspect 8, wherein the particles have a maximum swelling factor in water of 300%, assuming 100% dry particles.

A $10^{th}$ aspect of the invention in hand consists of porous particles from a cross-linked polymer containing hydroxyl or amino groups, wherein the particles have a maximum swelling factor in water of 300%, assuming 100% dry particles.

An $11^{th}$ aspect of the invention in hand consists of porous particles according to one of the aspects 6 to 10, wherein the dry bulk density is in the range from 0.25 g/mi to 0.8 g/ml.

A $12^{th}$ aspect of the invention in hand consists of porous particles according to one of the aspects 0 to 11, wherein the mean pore size of the particles is in the range from 1 nm to 100 nm, determined by means of inverse size exclusion chromatography.

A $13^{th}$ aspect of the invention in hand consists of porous particles according to one of the aspects 8 to 12, wherein the mean particle size is in the range from 5 μm to 1000 μm.

A $14^{th}$ aspect of the invention in hand is a composite material which contains the porous particles according to one of the aspects 8 to 13 dispersed in a continuously aqueous phase, whereby the continuous aqueous phase is embedded into a hydrogel and/or part of a hydrogel and/or surrounded by a water-insoluble, ion-permeable envelope.

A $15^{th}$ aspect of the invention in hand is a composite material according to aspect 14, which has the form of particles.

A $16^{th}$ aspect of the invention in hand is a Composite material according to aspect 15, wherein the particles have a spherical, lenticular or bacillar shape.

A $17^{th}$ aspect of the invention in hand is a composite material according to aspect 16, wherein the particles have a lenticular form and have a mean diameter in the range from 1 mm to 10 mm crosswise and a mean height in the range from 100 μm to 1000 μm.

An $18^{th}$ aspect of the invention in hand is a composite material according to one of the aspects 14 to 17, wherein the hydrogel is a gel on the basis of a polymer which contains hydroxyl groups.

A $19^{th}$ aspect of the invention in hand is a composite material according to one of the aspects 14 to 18, wherein the hydrogel is made of a polymer on the basis of polyvinyl alcohol.

A $20^{th}$ aspect of the invention in hand is a method for producing a composite material according to one of the aspects 14 to 19, which comprises the following steps:
(a) Preparation of an aqueous solution which contains a polymer able to form a hydrogel, and an accessory agent;
(b) Adding of porous particles according to one of the aspects 3 to 13 to the aqueous solution;
(c) Extraction of water from the aqueous solution from step (b) down to a water content of maximum 50 percent by weight, with reference to the total quantity of the aqueous solution after water removal, whereby a phase separation into an aqueous phase containing the accessory agent and a phase containing the polymer able to form a hydrogel in the form of a polymer is carried out, whereby the hydrogel contains the porous particles; and
(d) Separation of the two phases to obtain the composite material.

A $21^{st}$ aspect of the invention in hand is a method for producing a composite material according to one of the aspects 14 to 19, which comprises the following steps:

(a) Dispersing of porous particles according to one of the aspects 8 to 13 in an aqueous phase containing a cross-linking agent, a hydrogel precursor which can be cross-linked with a cross-linking agent, or a hydrogel precursor which can be thermally cross-linked to obtain a dispersion;

(b) Formation of a composite material from the dispersion obtained with (a), whereby (b1) the dispersion containing a cross-linking agent is, for encapsulation with a largely water-insoluble, ion-permeable envelope, introduced into a solution which contains a gel precursor, which can be cross-linked by the cross-linking agent, of a water-insoluble, ion-permeable envelope material, or (b2) the dispersion containing a hydrogel precursor which can be thermally cross-linked through heat or cold Is introduced, for the formation of discrete gel elements, into a liquid phase which has a temperature which is sufficiently high or low for the thermal cross-linking of the gel precursor, or (b3) the dispersion containing a hydrogel precursor, which can be cross-linked with a cross-linking agent, is introduced into a solution containing the cross-linking agent, or the cross-linking agent is integrated into the dispersion.

A $22^{nd}$ aspect of the invention in hand is the use of porous particles according to one of the aspects 8 to 13 or a composite material according to one of the aspects 14 to 19 for the purification of organic molecules or the separation of metals from solutions.

The invention claimed is:

1. Method for producing porous particles from a cross-linked polymer, comprising the following steps:
    (a) applying an organic polymer containing hydroxyl or amino groups onto a porous inorganic carrier material in particulate form, where the inorganic carrier material can be dissolved under aqueous-alkaline conditions at pH>10;
    (b) cross-linking the organic polymer in the pores of the inorganic carrier material; and
    (c) dissolving out of the inorganic carrier material to obtain the porous particles from a cross-linked organic polymer, wherein the porous particles have a maximum swelling factor in water of 300% increase, assuming 100% dry particles.

2. Method according to claim 1, wherein the cross-linked organic polymer from step (c) is derivatized in its side groups with aliphatic or aromatic groups, which groups may also contain heteroatoms, and wherein the aliphatic or aromatic groups may also be substituted with anionic or cationic groups and groups which can be protonated or deprotonated or organic groups with characteristics of a Lewis base which have heteroatoms with free electron pairs, selected from the group consisting of N, O, P, As and S.

3. Porous particles from a cross-linked polymer obtained according to a method according to claim 1.

4. Porous particles according to claim 3, wherein the particles have a maximum swelling factor in water of 300% volume increase, assuming 100% dry particles.

5. Porous particles according to claim 3, wherein the dry bulk density is in the range from 0.25 g/ml to 0.8 g/ml.

6. Composite material which contains the porous particles according to claim 3 dispersed in a continuous aqueous phase, whereby the continuous aqueous phase is embedded into a hydrogel and/or is part of a hydrogel, and/or surrounded by a water-insoluble, ion-permeable envelope.

7. Composite material according to claim 6 which has the form of particles.

8. Composite material according to claim 7, wherein the particles have a spherical, lenticular or bacillar shape.

9. Method for producing a composite material containing porous particles dispersed in a continuous aqueous phase, comprising the following steps:
    (a) preparing an aqueous solution which contains a polymer able to form a hydrogel, and an accessory agent;
    (b) adding the porous particles according to claim 1 to the aqueous solution;
    (c) extracting water from the aqueous solution from step (b) down to a water content of maximum 50 percent by weight with reference to the total quantity of the aqueous solution after water removal, whereby a phase separation into an aqueous phase containing the accessory agent and a phase containing the polymer able to form a hydrogel in the form of a hydrogel is carried out, whereby the hydrogel contains the porous particles; and
    (d) separating the two phases to obtain the composite material.

10. Method for producing a composite material containing porous particles dispersed in a continuous aqueous phase, comprising the following steps:
    (a) dispersing the porous particles according to claim 1 in an aqueous phase containing a cross-linking agent, a hydrogel precursor which can be cross-linked with a cross-linking agent, or a hydrogel precursor which can be thermally cross-linked to obtain a dispersion;
    (b) forming a composite material from the dispersion obtained with (a), whereby
        (b1) the dispersion which contains a cross-linking agent is, for encapsulation with a largely waster-insoluble, ion-permeable envelope, introduced into a solution which contains a gel precursor, which can be cross-linked by the cross-linking agent, of a water-insoluble, ion-permeable envelope material, or
        (b2) the dispersion which contains a hydrogel precursor which can be thermally cross-linked through heat or cold is, for the formation of discrete gel elements, introduced into a liquid phase which has a temperature which is sufficiently high or low for the thermal cross-linking of the gel precursor, or
        (b3) the dispersion which contains a hydrogel precursor which can be cross-linked with a cross-linking agent is introduced into a solution which contains the cross-linking agent, or the cross-linking agent is integrated into the dispersion.

11. A method for the purification of organic molecules or for the separation of metals from solutions comprising contacting a solution containing organic molecules or metals with the porous particles according to claim 3.

12. Filter cartridge which contains porous particles according to claim 1 or a composite material which contains the porous particles.

13. A method for the purification of organic molecules or for the separation of metals from solutions comprising contacting a solution containing organic molecules or metals with a composite material containing the porous particles according to claim 1.

* * * * *